US006945541B2

(12) United States Patent
Brown (10) Patent No.: US 6,945,541 B2
(45) Date of Patent: Sep. 20, 2005

(54) VEHICLE SUSPENSION

(75) Inventor: Steven N. Brown, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 60 days.

(21) Appl. No.: 10/347,941

(22) Filed: Jan. 21, 2003

(65) Prior Publication Data

US 2005/0098964 A1 May 12, 2005

(51) Int. Cl.$^7$ .............................................. B60G 17/005
(52) U.S. Cl. ................................................... 280/5.507
(58) Field of Search ............................... 280/5.5, 5.507, 280/5.508, 124.106, 124.107

(56) References Cited

U.S. PATENT DOCUMENTS

| | | |
|---|---|---|
| 4,892,328 A | 1/1990 | Kurtzman et al. |
| 4,960,290 A | 10/1990 | Bose |
| 4,969,662 A | 11/1990 | Stuart |
| 4,981,309 A | 1/1991 | Froeschle et al. |
| 5,028,073 A | 7/1991 | Harms et al. |
| 5,060,959 A | 10/1991 | Davis et al. |
| 5,216,723 A | 6/1993 | Froeschle et al. |
| 5,350,983 A | 9/1994 | Miller et al. |
| 5,441,298 A | 8/1995 | Miller et al. |
| 5,489,115 A | 2/1996 | Osaki et al. |
| 5,704,632 A | 1/1998 | Lee |
| 5,722,673 A | 3/1998 | Mauz |
| 5,740,039 A | 4/1998 | Hirahara et al. |
| 5,765,858 A | 6/1998 | Kawagoe et al. |
| 5,782,484 A | 7/1998 | Kuhn, Jr. |
| 5,821,434 A | 10/1998 | Halliday |
| 5,823,552 A | 10/1998 | Etnyre et al. |
| 5,845,926 A | 12/1998 | Davis et al. |
| 5,851,016 A | 12/1998 | Kawagoe et al. |
| 5,868,410 A | 2/1999 | Kawabe et al. |
| 5,873,587 A | 2/1999 | Kawabe et al. |
| 5,879,026 A | 3/1999 | Dostert et al. |
| 5,895,063 A | 4/1999 | Hasshi et al. |
| 5,896,941 A | 4/1999 | Kajiwara et al. |
| 5,899,288 A | 5/1999 | Schubert et al. |
| 6,000,702 A | 12/1999 | Streiter |
| 6,113,119 A | 9/2000 | Laurent et al. |
| 6,223,108 B1 * | 4/2001 | Izawa et al. .................. 701/36 |

FOREIGN PATENT DOCUMENTS

| | | | |
|---|---|---|---|
| EP | 0 340 541 A | 11/1989 | |
| EP | 0 344 923 A1 | 12/1989 | |
| EP | 0982162 A2 | 3/2000 | |
| JP | 04358913 A * | 12/1992 | ............ B60G/3/20 |

OTHER PUBLICATIONS

Barak, "Passive Versus Active and Semi–Active Suspension from Theory to Application in North American Industry," Worldwide Passenger Car Conference and Exposition, Dearborn, Michigan, Sep., 28–Oct. 1, 1992 (conference).

Barak, "Magic Numbers in Design Suspensions for Passenger Cars," *Safe 1991 Transactions Journal of Passenger Cars*, Section 6–vol. 100, pp. 1698–1733, 1992.

Gillespie, "Chapter 7–Suspensions," *Fundamentals of Vehicle Dynamics*, pp. 268–273, 1992.

Staniforth, "Race Tech," *Race Car Technology*, p. 142, 1988, Competition Car Suspension.

* cited by examiner

*Primary Examiner*—Faye M. Fleming
(74) *Attorney, Agent, or Firm*—Fish & Richardson P.C.

(57) ABSTRACT

An active suspension for a wheeled vehicle is configured for improved occupant comfort, with an advantageously low maximum horizontal kinetic displacement of the wheel assembly, and particularly low horizontal inertial and tire loads, as the suspension moves through jounce and rebound under active control. The front suspension is a strut configuration, with an active actuator in place of the strut, and the rear suspension is a double wishbone configuration.

64 Claims, 4 Drawing Sheets

VEHICLE SUSPENSION

TECHNICAL FIELD

This invention relates to suspensions for wheeled vehicles, such as automobiles, and particularly to active suspensions.

BACKGROUND

A primary purpose of a vehicle's suspension system is to provide vertical compliance between the road and the chassis, in order to isolate the chassis occupants from the roughness in the road and to maintain tire contact with the road, thus providing a path for transferring forces from the bottom of the tire to the chassis, such as to change the speed or direction of the vehicle. Examples of some common independent suspension linkages are known generally as strut & link (also called MacPherson strut), double A-arm (also called double wishbone or SLA), semi-trailing arm, and multi-link.

Each wheel assembly is connected to the chassis by one or more links. A link is defined as a substantially rigid member with a joint or joints at each end that allows a particular motion to take place. It is these links that control the motion (or path) of the wheel as it moves up and down over road bumps. These links also have to transmit the forces generated at the tire-road interface to the chassis. Rubber bushes are typically used at the ends of links to reduce the transmission of vibrations to the chassis. Unfortunately, the use of bushes also introduces compliance into the linkage that can be undesirable for accurately controlling wheel motion.

In an active suspension, controlled forces are introduced to the suspension, such as by hydraulic or electric actuators, between the sprung mass of the vehicle body and its occupants, and the unsprung mass of the wheel assemblies. The unsprung mass is the equivalent mass that reproduces the inertial forces produced by the motions of those parts of the vehicle not carried by the suspension system. This primarily includes the wheel assemblies, any mass dampers associated with the wheel assemblies, and some portion of the mass of the suspension links. The sprung mass is the mass of those parts of the vehicle carried by the suspension system, including the body. Active suspension systems preferably are able to introduce forces that are independent of relative wheel motions and velocities.

U.S. Pat. No. 4,981,309 discloses an active suspension system employing electro-magnetic actuators at each wheel assembly of a rolling vehicle. U.S. Pat. No. 6,364,078, and EP publication 0982162, published Mar. 1, 2000, together disclose a mass damper useful with such electromagnetic suspension actuators and that can move independent of the wheel assembly, but only in a substantially vertical direction. In all other directions, the mass of the mass damper is effectively added to the inertia of the unsprung mass. The entire contents of the above U.S. patents are incorporated herein by reference as if set forth in their entirety.

Generally, all kinematically-induced wheel forces are either forces created by the interaction between the tires and the road, or inertia forces generated by the motion of the unsprung mass. The forces occurring between the tires and road are transferred via the suspension system to the body. As long as the wheel assembly does not change its horizontal position or angular orientation relative to a smooth road surface, no substantial lateral or longitudinal tire forces (ignoring friction) will be created. Unfortunately, most practical independent suspension linkages do not provide pure vertical wheel motion, and thus some horizontal movement of the tire is inevitable.

It is both unnerving and disconcerting to feel a steering yaw motion induced without any steering input from the driver. Self-steering, as it is generally called, is especially objectionable when it occurs in the rear of the vehicle, behind where the passengers are seated. The static toe angle of a wheel, measured at a specific height of the wheel relative to the chassis, is the angle between the central longitudinal axis of the vehicle and the line intersecting the center plane of one wheel with the road surface. A wheel is "toed-in" if the forward portion of the wheel is tuned toward the vehicle's central longitudinal axis, and "toed-out" if turned away. It is desirable that the static toe angle be very close to zero degrees at speed, to reduce tire wear and rolling resistance. It is also important for handling considerations whether the toe angle, which is normally set when the vehicle is stationary, changes with speed, roll, pitch or wheel jounce and rebound. Roll is the rotation of the vehicle body about a longitudinal axis of the vehicle, such as is induced during sharp cornering, especially with very soft suspension rates. Pitch is rotation of the body about the lateral axis of the vehicle, such as is induced by heavy braking or acceleration. Jounce is the relative displacement of the wheel upward toward the body from the static condition, typically compressing the suspension springs, while rebound is the relative displacement of the wheel downward, away from the body, from the static condition.

The geometry of a suspension linkage determines a wheel's static toe angle and how it changes with wheel travel. The length and position of a toe control link are primarily responsible for the final shape of the "toe angle vs. wheel travel" curve. It is generally understood that incorporating deliberate toe change as a function of wheel travel can offset other ride-induced handling effects. For example, on many rear suspensions the wheel on the outside of a bend will tend to go into jounce and be pushed into toe-out by lateral cornering forces. This creates an oversteer effect that can lead to a disconcerting and potentially dangerous overswing of the rear of the vehicle. To compensate for this effect, the toe control link may be configured to effect a toe-in on jounce (such as will be experienced by the outside wheel on cornering). As a reference point, a stock 1994 LEXUS LS400 rear suspension is believed to be configured to have about 0.6 degrees of toe-in at about 80 millimeters of jounce travel.

On front suspensions, cornering forces generally tend to straighten the turned-ill wheel on the outside of a curve, slightly offsetting steering input and causing a safe and predictable understeer condition. Introducing geometric toe-out with jounce will tend to increase understeer in a front suspension.

The tread width for a given pair of wheels is defined as the lateral distance between the center of tire contact with the road. When wheels jounce and rebound on most practical independent suspensions for passenger cars, the tread width changes. Solid axle suspensions (generally not favored due to ride quality and weight issues) and full trailing arm suspensions (generally considered only for rear suspensions on straight line racing vehicles, such as for drag racing), are generally immune from tread width changes. On preferred passenger vehicle independent suspensions, such as the strut and SLA suspensions, the rather short suspension links pivot about fixed points or axes on the body, inboard of the wheel assemblies. The outer ends of the links (attached to the wheel assemblies) are therefore constrained to move in a substantially circular path with respect to the body, as viewed from either end of the vehicle. This link motion alters the position of the bottom of the tire relative to the body, changing the overall tread width.

Tread width change creates lateral forces, higher rolling resistance, and deterioration in directional stability of the vehicle. Conventional passenger cars typically have tread widths that widen with jounce travel and narrow during rebound. When a bump compresses both wheels of an independent axle simultaneously, the lateral forces applied to the vehicle body by lateral movement of one wheel tend to be balanced by lateral forces from the other wheel. Unfortunately, bumps seldom generate equal jounce and rebound on both sides of the vehicle simultaneously, and unequal wheel motions result in net lateral forces being applied to the vehicle body from tread width changes. As a reference point, a single 175/65 R 14 radial tire is believed to create about 30 Newtons of lateral force per 1 millimeter of tread width change at 80 kilometers per hour (kph).

As undesirable as tread width change can be, configuring a conventional suspension to geometrically eliminate tread width changes tends to create unacceptable levels of roll during cornering, due to positioning of the theoretical "roll centers" of the front and rear suspensions. An excessive amount of roll is uncomfortable to the driver and passengers, can adversely affect tire grip, and uses up valuable suspension travel needed to avoid bottoming of the suspension on bumpy corners. The suspension roll center is a theoretical point in the center of the vehicle (viewed from the front) and in the center of the axle (viewed from the side) around which the vehicle body will rotate when subject to centrifugal force. It is also the point at which lateral forces can be viewed as effectively applied to the sprung body mass by the suspension. Therefore, the tendency for the vehicle body to roll is proportional to the distance between the roll center and the center of gravity of the body, and the optimum position of the roll center to minimize roll is at the height of the center of gravity of the sprung mass. However, the higher the roll center, the larger the tread width change. With the roll center above ground level, tread width will increase during jounce and decrease on rebound. It will be understood that the location of the roll center constantly changes with suspension position.

Wheel camber is another variable for tuning the characteristics of a vehicle suspension. Camber is the angle between the wheel center plane and a vertical to the plane of the road. Camber is positive when the top of the tire is inclined outwards away from the center of the vehicle, and negative when inclined inwards. When a vehicle is loaded to its design weight, a slightly positive camber value of, for example, 0.1 degree is considered ideal to keep the tires as upright as possible on the crowned road surface, for low rolling resistance and uniform tire wear. Many passenger car suspensions employ a static camber setting between about zero and negative 1.3 degrees, and effect dynamic camber change through selective suspension compliance, to offset negative static camber to try to provide a nearly zero camber on the outside tires in cornering. Some have said that keeping the camber near zero under all conditions is a primary goal of modern suspension systems, perhaps because tires are all designed to operate at a particular camber angle for optimum grip, and even small deviation from that angle can reduce tire grip capability.

When a vehicle with independent suspension is cornering, the wheels tend to tilt with the body. Thus, as the car body rolls toward the outside of the bend, the outside wheel goes into positive camber relative to the road, reducing its lateral grip. To combat this effect, many suspension linkages are designed to geometrically induce negative camber in jounce and positive camber as they rebound, even though such geometric camber adjustments will cause camber shifts during bumps as well as during cornering.

Cars with relatively soft suspensions will tend to pitch during braking and acceleration, dipping at the front and rising at the rear under heavy braking, and the opposite during hard acceleration. This pitching motion tends to put more strain on the neck muscles of the vehicle occupants than during simple linear acceleration and deceleration without such body rotation. Also, pitching motions are perceived to be objectionable by many passengers. Many suspensions incorporate anti-dive (to reduce forward pitching during braking) and anti-squat (to reduce rearward pitching during acceleration) configurations to reduce this effect.

An example of a simple anti-dive design is the use of a leading arm in the front suspension and a trailing arm in the rear suspension. With a leading arm, the effective arm pivot at the body is rearward of the effective arm pivot at the wheel. The relative locations of the effective pivots is reversed for a trailing arm. Under braking action, the calipers tend to rotate with the wheel producing an upward reaction at the front of the body and a downward force at the rear, producing an anti-dive effect. Traditional suspension linkages, like the double wishbone, can be designed with the wishbones pivot axes angled to give an effective leading arm length. However, such arrangements tend to induce undesirable wheel caster angle changes during jounce and rebound. Therefore, some manufacturers compromise by correcting only a percentage (typically, about 50 percent) of the brake live. Furthermore, an anti-dive geometry carefully calculated to match a particular front/rear brake force distribution will seldom give the perfect correction for anti-squat.

Improvements in suspension configuration are generally needed, particularly for use with active suspension control means.

SUMMARY

In the course of our research I have discovered that the design of the suspension linkage for an active suspension vehicle should be considerably different from a traditional, passive suspension vehicle, for optimal occupant comfort and vehicle performance. Among other things, I have discovered that when pitch, roll and vertical body motions and vibrations are greatly reduced or eliminated by an active suspension system of appropriate bandwidth, secondary forces associated with small horizontal wheel motions (that are normally masked by other vehicle body motion) become both perceptible and subjectively very objectionable.

These forces can be objectionable not only because of the elimination of other body motions, but also because active suspension systems tends to exaggerate their effect by employing more of the available suspension travel, more often, than occurs with a conventional suspension. Also, incorporation of significant damping mass in the wheel assemblies increases horizontal wheel inertia and can further exaggerate induced loads. As a general analogy, under active suspension control the vehicle body can be controlled to move at speed along a substantially linear path (like a cruise missile), while the wheels are actively moved up and down over road surface irregularities as needed. Ideally, the body itself is moved in other than a purely forward linear direction in response to road inputs (Such as bumps or potholes) only when available wheel travel is determined to be insufficient to adequately absorb such inputs. This differs substantially from a conventional suspension in which progressive springs, bumpers and dampers always exert force on the vehicle body based on the position and velocity of the wheel relative to the vehicle body.

Some aspects of the invention feature particularly low horizontal kinetic displacement of a vehicle suspension. Broadly defined with respect to a quarter-vehicle model and an independent suspension, horizontal kinetic displacement is the ratio of unsprung mass to sprung mass (acting on and associated with a given road wheel), multiplied by the horizontal displacement of the gravitational center of the unsprung mass. In other words, if the overall vehicle weight is 4000 pounds (18 kilo-Newtons), equally distributed across four wheels, the weight of the effective unsprung mass operating at one of the wheels is 250 pounds (1100 Newtons), and the gravitational center of that unsprung mass moves horizontally a maximum of 100 millimeters from a starting position through an associated range of wheel motion, then the maximum horizontal kinetic displacement of the suspension at that wheel would be (250/(4000/4))*100, or 25 millimeters. It will be understood that the horizontal displacement of the wheel hub will give a good approximation of the horizontal displacement of the gravitational center of the unsprung mass for most purposes. Horizontal displacement is meant to include any displacement occurring in a plane generally parallel to the road surface, whether related to changes in track width or wheelbase. In many cases, horizontal displacement will include a longitudinal component measured along an axis running in a direction of travel of the vehicle and a lateral component measured along an axis extending perpendicular to a direction of travel of the vehicle.

Various aspects of the invention feature a wheel suspension for suspending a wheel assembly from a sprung body of a wheeled vehicle, and adapted to permit the wheel assembly to move relative to the sprung body through a jounce and rebound vertical travel, as limited by mechanical stops.

According to one aspect of the invention, the suspension includes upper and lower structural members and an actuator. The upper structural member is coupled to the wheel assembly to define an upper relative rotation center, and rotationally coupled to the sprung body at an upper pivot. The lower structural member is coupled to the wheel assembly to define a lower relative rotation center disposed on a side of a gravitational center of the wheel assembly opposite the upper relative rotation center, and rotationally coupled to the sprung body at a lower pivot. The actuator is connected to both the wheel assembly and the sprung body and adapted to apply an active control force between the body and wheel assembly to move the wheel assembly over an active control range of at least 80 percent of the vertical travel of the wheel assembly. The upper and lower pivots and relative rotation centers are positioned to produce a maximum horizontal kinetic displacement of the wheel assembly of less than about 4.0 millimeters as the actuator moves through the active control range.

By "active control force" I mean forces introduced to a suspension by a controlled actuator. Such forces may be independent of relative wheel motions and velocities.

Progressively preferred limits of maximum horizontal kinetic displacement are 1.5 millimeters, 0.75 millimeters and 0.30 millimeters.

For many applications, horizontal kinetic displacement as measured along an axis running in a direction of travel of the vehicle is preferably less than about 0.5 millimeters. Horizontal kinetic displacement as measured along an axis extending perpendicular to a direction of travel of the vehicle is preferably less than about 3.5 millimeters.

In some embodiments the wheel assembly is a rear wheel assembly of an automobile. In some configurations the relative rotational centers are disposed rearward and outboard of their respective pivots.

The wheel assembly, in some embodiments, has a horizontally unsprung mass weight greater than about 120 pounds (530 Newtons), and may include a damper mass vertically sprung with respect to a remainder of the wheel assembly. By "remainder" I mean to include all portions of the wheel assembly with respect to which the damper mass is sprung.

The active control range preferably covers a vertical displacement of the gravitational center of the wheel assembly of at least 0.2 meters. The actuator preferably has an active stroke sufficient to displace the gravitational center of the wheel assembly through its entire vertical travel.

In some preferred configurations, the wheel suspension defines a geometry selected to produce a maximum wheel toe change of less than about 0.1 degree through its vertical travel.

Preferably, the wheel suspension defines a geometry selected to produce a maximum wheel camber change of less than about 3.0 degrees through its vertical travel.

In some cases, the upper relative rotation center and upper pivot are disposed along a first generally horizontal line, and the lower relative rotation center and lower pivot are disposed along a second generally horizontal line, with the automobile at rest and loaded to its design weight. The upper and lower rotation centers are preferably separated from their respective pivots by different arm lengths. The term "design weight" should be understood from ISO/IS 2958, which specifies the loading for passenger vehicles as a function of the number of seats. Typically, the suspension is roughly at the center of its vertical travel at rest at the design weight.

The mechanical stops are preferably positioned to allow at least about 2.0 inches (50 millimeters) of jounce and about 2.0 inches (50 millimeters) of rebound, more preferably at least about 3.0 inches (75 millimeters) each of jounce and rebound, and even more preferably at least about 4.0 inches (100 millimeters) each of jounce and rebound.

In some arrangements the pivots are located inboard of their relative rotational centers.

The wheel suspension is preferably constructed and arranged to provide a maximum product of lateral tire stiffness and lateral displacement of a tire patch between the wheel assembly and a support surface of less than about 500 pounds (2200 Newtons), more preferably less than about 150 pounds (670 Newtons).

The wheel suspension is also preferably constructed and arranged to provide a maximum product of angulation of a wheel rim of the wheel assembly about a vertical axis through the vertical travel (i.e., toe change through suspension travel) and a cornering stiffness of a tire of the wheel assembly (i.e., the slope of the lateral force curve as a function of slip angle, at a zero degree slip angle) of less than about 30 pounds (130 Newtons).

Preferably, the wheel suspension defines a geometry selected to produce a maximum tread width change of less than about 5.0 millimeters through its vertical travel.

In some embodiments, the actuator includes an electric motor adapted to receive electrical power and produce the active control force.

According to another aspect of the invention, the suspension includes an actuator connected to both the wheel assembly and the sprung body and adapted to apply an active control force between the body and wheel assembly to move the wheel assembly through an active control range along its vertical travel, and a structural link coupled to the wheel assembly to define a relative rotation center and rotationally coupled to the sprung body at a pivot. The suspension forms a geometry selected to produce a maximum lateral displacement of the gravitational center of the wheel assembly of less than about 20 millimeters through the jounce and rebound vertical travel, and a maximum wheel camber change of less than about 3.0 degrees through the jounce and rebound vertical travel.

In some configurations the structural link is a first structural link coupled to the wheel assembly to define a first relative rotation center, and rotationally coupled to the sprung body at a first pivot, with the suspension further including a second structural link coupled to the wheel assembly to define a second relative rotation center above the first relative rotation center, and rotationally coupled to the sprung body at a second pivot above the first pivot.

In some applications, the wheel suspension suspends a rear wheel assembly from a sprung body of a wheeled vehicle and defines a geometry selected to produce a maximum longitudinal displacement of less than about 4.0 millimeters.

In some other applications, the wheel suspension suspends a front wheel assembly front a sprung body of a wheeled vehicle and defines a geometry selected to produce a maximum longitudinal displacement of less than about 5.0 millimeters.

The wheel suspension preferably defines a geometry selected to produce a maximum horizontal kinetic displacement of the wheel assembly of less than about 4.0 millimeters as the actuator moves through an active control range over its vertical travel. The active control range preferably covers a vertical displacement of the gravitational center of the wheel assembly of at least 0.2 meters.

In some preferred implementations, the suspension defines a geometry selected to produce a wheel toe change of less than about 0.1 degrees through its vertical travel, is constructed and arranged to provide a maximum product of lateral tire stiffness and lateral displacement of a tire patch defined between wheel assembly and a support surface of less than about 500 pounds (2200 Newtons), and is constructed and arranged to provide a maximum product of angulation of a wheel rim of the wheel assembly about a vertical axis through the vertical travel and a cornering stiffness of a tire of the wheel assembly of less than about 30 pounds (130 Newtons).

The suspension also preferably defines a geometry selected to produce a maximum tread width change of less than about 20 millimeters through its vertical travel.

According to another aspect of the invention, the suspension includes an actuator connected to both the wheel assembly and the sprung body and adapted to apply an active control force between the body and wheel assembly to move the wheel assembly vertically over a total active control range of vertical wheel displacement. The suspension forms a geometry selected to produce a maximum horizontal kinetic displacement of the wheel assembly of less than about 3.0 millimeters as the wheel assembly is moved through the total active control range of vertical wheel displacement.

According to yet another aspect of the invention, the suspension includes upper and lower structural members and is adapted to permit the rear wheel assembly to move relative to the sprung body through a jounce and rebound vertical travel of at least two inches total, as limited by mechanical stops. The upper structural member is coupled to the wheel assembly to define an upper relative rotation center, and rotationally coupled to the sprung body at an upper pivot. The lower structural member is coupled to the wheel assembly to define a lower relative rotation center disposed on a side of a gravitational center of the wheel assembly opposite the upper relative rotation center, and rotationally coupled to the sprung body at a lower pivot. The suspension defines a geometry selected to produce a maximum lateral displacement of the gravitational center of the wheel assembly of less than about 10 millimeters through its vertical travel, and a maximum wheel camber change of less than about 3.0 degrees through its vertical travel.

In some preferred embodiments, the suspension also includes an actuator connected to both the wheel assembly and the sprung body and adapted to apply an active control force between the body and wheel assembly to move the wheel assembly along its vertical travel.

In some cases, the upper relative rotation center and upper pivot are disposed along a first generally horizontal line, and the lower relative rotation center and lower pivot are disposed along a second generally horizontal line, with the automobile at rest and loaded to its design weight.

Preferably, the maximum lateral displacement of the gravitational center of the wheel assembly is less than about 5 millimeters and the maximum wheel camber change is less than about 2.0 degrees through its vertical travel.

According to another aspect of the invention, the suspension includes a lower structural member coupled to the wheel assembly to define a lower relative rotation center disposed on a side of a gravitational center of the wheel assembly opposite the upper relative rotation center, and rotationally coupled to the sprung body at a lower pivot, and an actuator connected to both the wheel assembly and the sprung body to define an upper relative rotation center, and rotationally coupled to the sprung body at an upper pivot. The actuator is adapted to apply an active control force between the body and wheel assembly to move the wheel assembly over an active control range comprising at least 80 percent of the vertical travel of the wheel assembly. The tipper and lower pivots and relative rotation centers are positioned to produce a maximum horizontal kinetic displacement of the wheel assembly of less than about 4.0 millimeters as the actuator moves through the active control range.

In some cases the wheel assembly is a front wheel assembly of an automobile, and the horizontal kinetic displacement as measured along an axis extending perpendicular to a direction of travel of the vehicle is less than about 2.0 millimeters.

Preferably, the suspension defines a geometry selected to produce a maximum tread width change of less than about 10 millimeters through its vertical travel.

In some applications, the wheel assembly has a horizontally unsprung mass weight greater than about 120 pounds (530 Newtons). The wheel assembly may include a damper mass vertically sprung with respect to a remainder of the wheel assembly, for example.

According to another aspect of the invention, the suspension includes upper and lower structural members and an actuator. The upper structural member is coupled to the wheel assembly to define an upper relative rotation center, and rotationally coupled to the sprung body at an upper pivot. The lower structural member is coupled to the wheel assembly to define a lower relative rotation center disposed on a side of a gravitational center of the wheel assembly opposite the upper relative rotation center, and rotationally coupled to the sprung body at a lower pivot. The actuator is connected to both the wheel assembly and the sprung body and adapted to apply an active control force between the body and wheel assembly to move the wheel assembly over an active control range comprising at least 80 percent of the vertical travel of the wheel assembly. The suspension defines a geometry selected to produce a maximum tread width change of less than about 10 millimeters through its vertical travel.

According to another aspect of the invention, a wheel suspension for suspending a wheel assembly from a sprung body of a wheeled vehicle, and adapted to permit the wheel assembly to move relative to the sprung body through a jounce and rebound vertical travel, includes upper and lower structural members and an actuator. The upper structural member is coupled to the wheel assembly to define an upper relative rotation center, and rotationally coupled to the sprung body at an upper pivot. The lower structural member is coupled to the wheel assembly to define a lower relative rotation center disposed on a side of a gravitational center of the wheel assembly opposite the upper relative rotation center, and rotationally coupled to the sprung body at a lower pivot. The actuator is connected to both the wheel assembly and the sprung body and adapted to apply an active control force between the body and wheel assembly to move the wheel assembly over an active control range between mechanical stops disposed within the actuator.

Various aspects of the invention provide particularly pleasing ride characteristics, particularly in the context of fully active passenger vehicle suspensions. In many cases, the invention features combinations of suspension parameters previously considered unacceptable in conventional suspension configurations.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
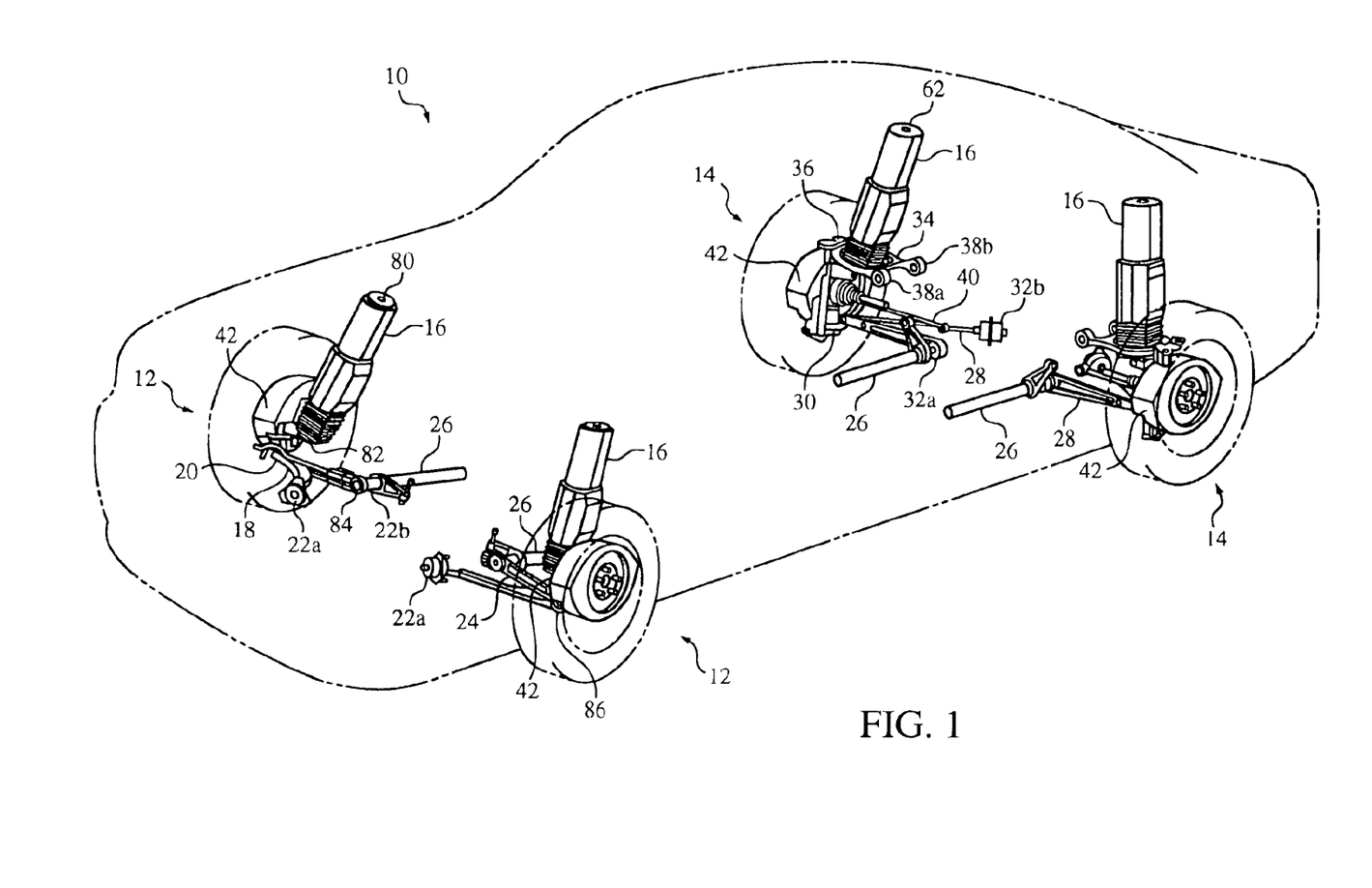
FIG. 1 is a perspective view of an active passenger vehicle suspension system.

Referring first to FIG. 1, the suspension of passenger vehicle 10 includes two independent front wheel suspension assemblies 12 and two independent rear wheel suspension assemblies 14, each including a high-speed electromagnetic actuator 16 connecting a corresponding wheel assembly to the body. In this illustrated system, the actuators 16 in the front suspension are generally positioned where one would expect to find a passive damper (e.g., shock absorber or strut) in a conventional suspension, although the function of actuators 16 is significantly different from that of a passive damper. Other major components of front suspensions 12 include lower control arms 18 pivotally connected to the front wheel assemblies at lower ball joints 20 and to the suspended body at lower arm bushes 22a and 22b; adjustable tie rods 24 pivotally connected to steering knuckles of the front wheel assemblies and to a connecting steering linkage (not shown); and torsion springs 26 connecting the suspended body with lower control arms and arranged to resist suspension deflection caused by static vehicle load, biasing the control arms to a desired neutral position. Major components of rear suspensions 14 include lower control arms 28 pivotally connected to the rear wheel assemblies at lower ball joints 30 and to the suspended body at lower arm bushes 32a and 32b; upper control arms 34 pivotally connected to the real wheel assemblies at upper ball joints 36 and to the suspended body at upper arm bushes 38a and 38b; adjustable toe links 40 pivotally connecting the rear wheel assemblies and suspended body for setting static rear toe angles; and torsion springs 26 of similar purpose as in the front suspensions. All control arm bushing axes extend generally parallel to the fore-aft centerline of the vehicle. Links extending between rotatable pivots, as opposed to links extending through sliding journals or the like, need only be configured and mounted to support tensile and compressive loads, and need not resist substantial moments or bending loads, reducing required weight and size of the links.

Each front and rear wheel assembly includes a mass damper assembly 42 packaged within the hub of the wheel as disclosed in U.S. Pat. No. 6,364,078. Tuned mass dampers 42 are essentially substantive reactive masses connected to the rest of the wheel assembly by respective springs and dampers (not shown) and constrained to move with respect to the wheel assembly only in a substantially vertical direction.

Figure 2:
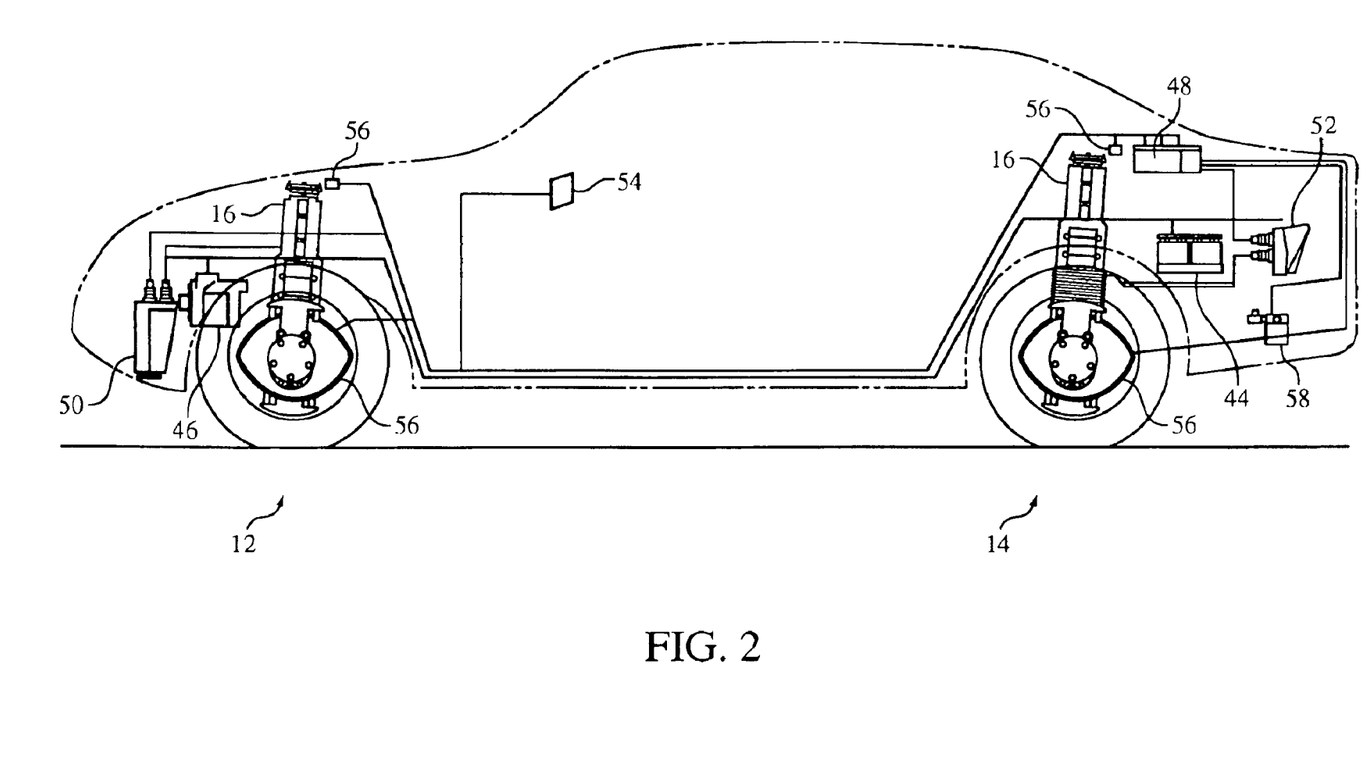
FIG. 2 is an overall electrical schematic of the suspension system, showing major components.

Referring next to FIG. 2, actuators 16 form part of an integrated and active vehicle suspension control system that actively controls relative wheel/body kinematic and kinetic parameters (e.g., loads, displacements and their rates) as a function of various system inputs. The system receives electrical power from a storage battery 44 or other electrical storage device charged by a generator 46 associated with the vehicle propulsion system (not shown). A central suspension control module (SCU) 48 controls how electrical power from battery 44 is applied to coils within each wheel actuator 16 to cause a desired wheel-body force or deflection response, sending signals to front amplifiers 50 and rear amplifiers 52 that drive the actuators of the front and rear wheel assemblies, respectively. The SCU receives inputs from individual accelerometers 56 positioned to sense vertical body acceleration adjacent each upper actuator connection and at each wheel assembly, and may receive additional input from a handwheel position sensor 54. Other or additional sensors may be employed as needed. In addition to controlling each actuator 16, SCU 48 may also control a load leveling system 58 as needed to reduce overall suspension power consumption from changes in static vehicle ride height and attitude. The SCU, collecting data from several sensors on the vehicle, calculates the actuator forces needed to provide the most comfortable ride. The SCU then commands each actuator to generate a force specifically calculated to keep the vehicle body virtually still, or to move in a desired manner, while allowing the wheels to travel up and down over bumps in the road.

Figure 3:
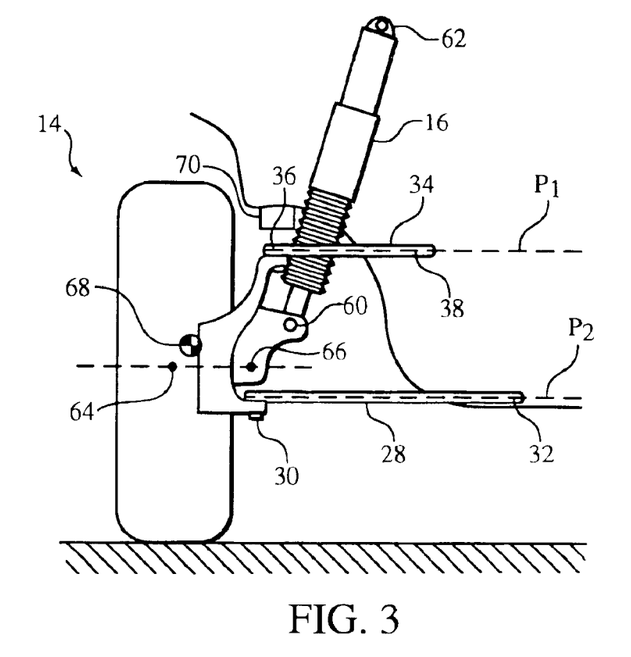
FIG. 3 is a schematic illustration of the rear suspension, as viewed from the front or rear of the vehicle.

FIG. 3 illustrates schematically one independent rear suspension 14, as viewed from the front or rear of the vehicle at rest. Upper control arm 34 is horizontal, with its outer hall joint 36 and inner bushes 38 all disposed within a single plane $P_1$ parallel to the road surface. Lower control arm 28 is substantially horizontal, in that its outer ball joint 30 and inner bushes 32 are all approximately within a single plane $P_2$ parallel to plane $P_1$. Actuator 16 is pivotably connected to the wheel assembly at a lower pivot 60 and to the body at an upper pivot 62. The geometric wheel center 64 and the center of the rear drive axle CV joint 66 are also illustrated, as is the center of gravity 68 of the effective unsprung mass. Jounce motion of the wheel assembly with respect to the vehicle body is limited by a mechanical stop 70, which may be functionally located within the housing of actuator 16. Rebound motion of the wheel assembly is similarly limited by a mechanical stop (not shown), which may be structured and positioned as generally known in the art, or within the housing of actuator 16.

Figure 4:
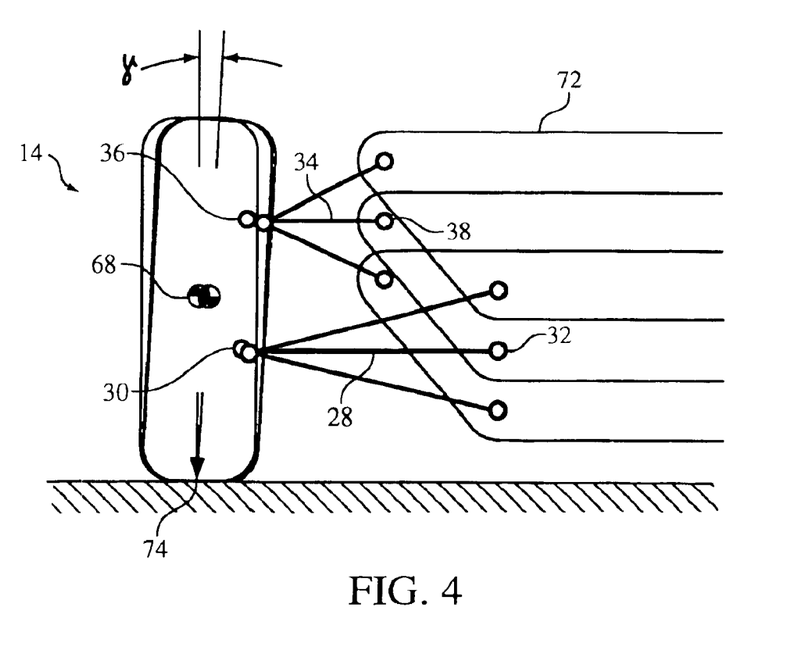
FIG. 4 illustrates jounce and rebound motion of the rear suspension.

As shown in FIG. 4, the rear suspension upper and lower control arms move through a range of motion as the wheel assembly traverses its full active travel over which the active suspension system applies controlled force to the wheel assembly. Preferably, such active range of travel will cover at least 80 percent of the full range of possible travel between mechanical stops (more preferably, it will cover the entire range of travel between fixed stops), and at least 0.2 meters for most passenger vehicle applications. For illustration, the control arms, body and wheel outline are shown in jounce (with body 72 at its lowest position with respect to the road surface), in rebound (with body 72 at its highest position with respect to the road surface), and at rest. The geometry of the various suspension links is preferably selected such that the center of contact 74 between the tire and road has very little lateral displacement through the active range of wheel motion, as the body moves along a vertical path as shown, to minimize lateral tire patch forces applied to the wheel assembly and, through the suspension, to the vehicle body. This can be accomplished, at least in part, by making the links long, level and parallel, which would normally be avoided to keep from positioning the roll center too low. As the active suspension avoids rolling, a lower roll center geometry is acceptable. Low lateral tire patch displacement is particularly beneficial in high-bandwidth active suspensions that are effective at substantially eliminating undesirable vertical accelerations due to road disturbances at speed, for as such disturbances are eliminated, lateral accelerations induced by ride-induced lateral tire patch motion become more noticeable and objectionable.

Figure 5:
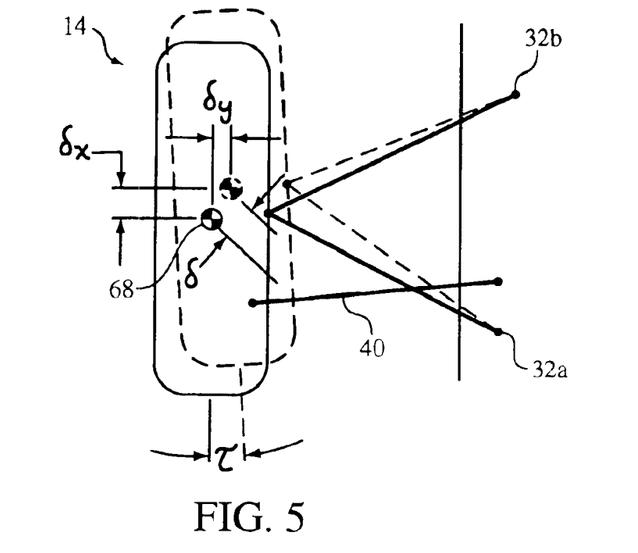
FIG. 5 is a schematic illustration of the rear suspension, as viewed from above.

FIG. 4 also illustrates that as the wheel assembly moves through its active jounce and rebound travel, the effective gravitational center 68 of the unsprung mass has some horizontal motion. As best seen in FIG. 5 (with displacements exaggerated for illustration), this horizontal displacement $\delta$ can be considered as being made up of two components: a fore-aft component $\delta_x$, and a lateral component $\delta_y$. I have found that subjective ride quality in active suspensions, particularly those with pronounced reduction in vertical accelerations at speed, is significantly improved by configuring the rear suspension to keep the overall horizontal kinetic displacement of each rear wheel assembly (the ratio of unsprung to sprung mass, times the horizontal wheel assembly displacement $\delta$) below at least 4.0 millimeters, with even greater advantage at substantially lower horizontal kinetic displacement limits. The lateral component $\delta_y$, which generates lateral forces and accelerations to the suspension that can be objectionable in the absence of vertical acceleration content, is preferably kept sufficiently low that the horizontal kinetic displacement as measured laterally (i.e., along an axis extending perpendicular to the direction of vehicle travel) is less than about 3.5 millimeters. The fore-aft component $\delta_x$, which can generate local fore-aft forces and accelerations, is preferably kept sufficiently low that the horizontal kinetic displacement as measured in the fore-aft direction (i.e., along an axis extending perpendicular to the direction of vehicle travel) is less than about 0.5 millimeters. As demonstrated by the example outlined below, low horizontal kinetic wheel displacements are achievable even in the context of double-A arm and semi-trailing arm suspension configurations having control arm ball joints 36 and 30 disposed significantly outboard of their respective inner control arm bushes 38 and 32. In the case of a semi-trailing arm configuration, the ball joints may also be located significantly rearward of their respective control arm bushes. Various machines are available for measuring horizontal suspension and wheel displacements by moving the body up and down, such as the Suspension Parameter Measuring Machine SPMM 4000 available from Anthony Best Dynamics Ltd of Bradford-on-Avon, Wiltshire, UK.

While many suspension designers incorporate geometric toe alteration to affect the handling behavior of a vehicle, I have found that in the context of active suspensions with greatly mitigated vertical acceleration content, significant toe change during jounce and rebound (labeled $\tau$ in FIG. 5) can be subjectively objectionable, both in terms of passenger comfort and perceived safety and control. As active suspension control eliminates body roll, toe change can cause what many characterize as self-steer or wander. This effect is exacerbated by the greater use of extreme wheel travel in active suspensions. I have found that if toe change $\tau$ is kept below about 0.1 degree over the active control range (preferably, under 0.083 degrees over the entire range of travel between stops), the self-steering effect is substantially reduced. Ideally, no toe change should occur when the wheels compress or rebound. It will be understood that dynamic toe change can be controlled by proper selection of appropriate suspension geometry and elastic bushing properties. Toe change can be measured approximately as the angulation of the wheel rim about a vertical axis during vertical travel under quasi-static conditions.

Referring back to FIG. 4, it is similarly advantageous in the context of active suspensions with substantially no body roll to keep the overall camber change $\gamma$ to less than about plus or minus 3.0 degrees through active vertical wheel motion. By keeping the tire substantially vertical, available tire cornering force is maximized while lateral unsprung mass inertial forces are also avoided. However, some minor camber change may be accommodated if necessary to reduce tread width changes (discussed below). For example, in the rear suspension application detailed below, +/−2.0 degrees of camber change was incorporated to keep the tread width change under about 2.5 millimeters. Preferably, the tires are selected to be generally insensitive to camber change. To that end, radial tires are preferred.

Figure 6:
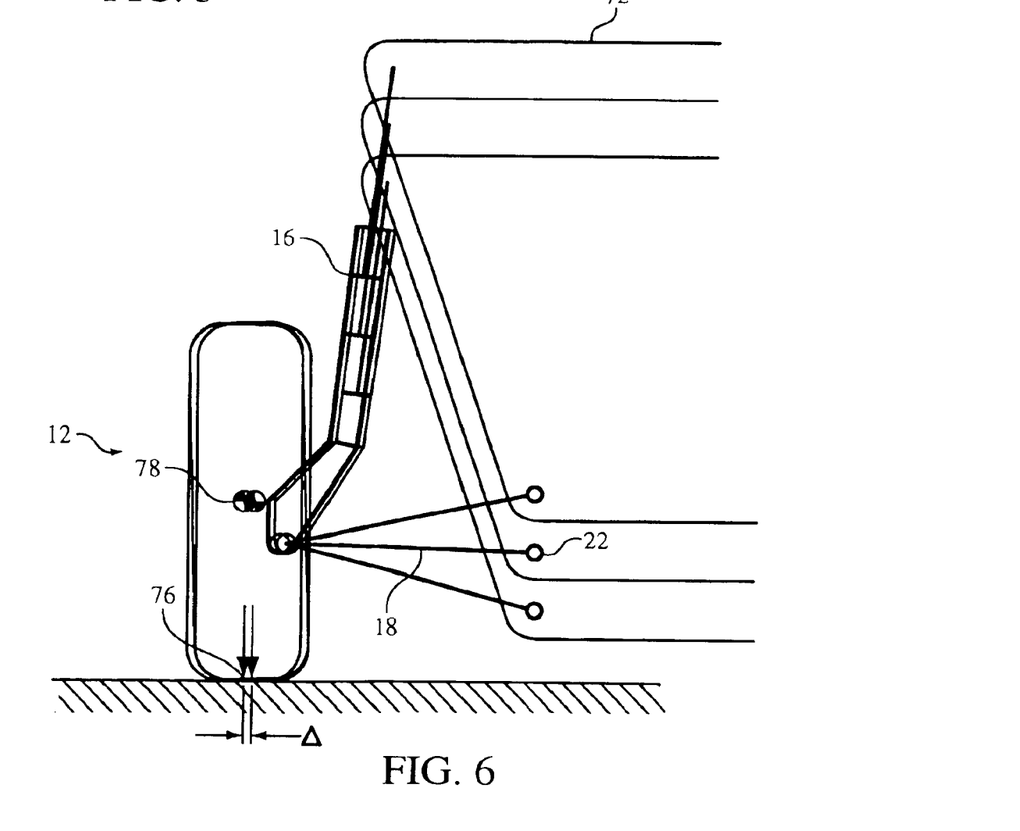
FIG. 6 is a schematic illustration of the front suspension, as viewed from the front or rear of the vehicle.

FIG. 6 schematically illustrates the active range of motion of front suspension 12 through jounce and rebound. Actuator 16 is positioned for zero scrub radius at the tire patch. As shown, vertical suspension motion results in a small lateral displacement $\Delta$ of tire contact patch center 76 as the body 72 moves along a purely vertical path. Displacement $\Delta$ is also known as a tread width change. As long as the front axle is ahead of the passenger compartment, a significant amount of front suspension tread width change Δ is tolerable. However, axles behind the occupants must be limited to extremely small tread changes, otherwise the resulting lateral forces creates the uncomfortable perception that someone is pushing the rear of the vehicle from side-to-side. Tread width change Δ in the front suspension is preferably less than about 35 millimeters, more preferably less than about 20 millimeters. Tread width change in the rear suspension is more noticeable and objectionable, and I prefer to keep rear tread width change to below 10 millimeters, more preferably less than 5 millimeters.

Keeping tread width change this low will tend to suggest keeping the suspension roll centers close to the ground. For example, the roll center location above the road surface can be estimated directly from the tread width change vs. wheel travel curve by looking at the intersection of a line perpendicular to a tangent on that curve with a line that represents the lateral centerline of the vehicle. The height of this intersection point above the road is approximately the Roll Center Height (RCH). However, as active suspension control can effectively eliminate body roll, the amount of roll in an ideally tuned active suspension vehicle will not change with a lower roll center. In many applications, the improvement in comfort obtained by limiting tread width change will be worth some increased actuator force necessary to resist roll. In many applications, and with sufficient actuator force available, roll center height should be optimized for minimal tread width change. Some tread width change can be tolerated for lower actuator force and system power requirements. Preferably, the maximum tread change is less than about 20 millimeters in the front suspension and less than about 5 millimeters in the rear. The difference in preferred ranges between front and rear comes from our observations on prototype active vehicles that passengers tend to be subjectively more disturbed by lateral forces originating from the rear of the vehicle. Preferably, the front RCH should be no more than about 5 percent of the front static tread width, and the rear RCH should be no more than about 1.25 percent of the rear static tread width.

Preferably, the product of lateral tire patch displacement Δ and non-rotating lateral tire stiffness is kept to less than about 500 pounds, preferably less than about 150 pounds. Tread width change may be measured in a garage using lateral bearing pads such as those employed on wheel alignment machines, by measuring the lateral displacement of the pads as the vehicle body is moved slowly up and down through its jounce and rebound motion, with the lateral displacement at each wheel taken to be one-half of the total vehicle track width change, assuming symmetrical suspension properties. Lateral tire stiffness should be measured as the average tire stiffness over about the first 10 millimeters of lateral tire patch displacement.

A stock 1994 LEXUS LS400 was modified to include front and rear suspensions generally as illustrated in FIG. 1, with the functional suspension link points positioned according to the table below. The "X" coordinates indicate the distance, in millimeters, from the wheel center as measured along the fore-aft axis of the vehicle. The "Y" coordinates indicate the distance, in millimeters, from the fore-aft centerline of the vehicle as measured laterally and perpendicular to the fore-aft direction. The "Z" coordinates indicate the vertical distance, in millimeters, from the wheel center. The left column of the table corresponds to reference numbers in the drawings. Values are given for one side of the vehicle only; locations of suspension points on the other side of the vehicle can be derived by mirroring about the fore-aft center plane of the vehicle.

|     |                         | X       | Y       | Z       |
| --- | ----------------------- | ------- | ------- | ------- |
|     | FRONT SUSPENSION        |         |         |         |
| 78  | Wheel Center            | 0.00    | 785.65  | 0.00    |
| 80  | Upper actuator joint    | −37.74  | 550.21  | 599.21  |
| 82  | Lower actuator joint    | 0.15    | 634.01  | −5.56   |
| 22a | Lower arm, front bush   | 426.09  | 352.43  | −90.98  |
| 22b | Lower arm, rear bush    | 7.85    | 352.43  | −90.98  |
| 20  | Lower arm ball joint    | 7.85    | 727.48  | −126.62 |
| 84  | Inner tie rod pivot     | 88.49   | 353.06  | −63.98  |
| 86  | Outer tie rod ball joint| 132.05  | 752.81  | −97.92  |
|     | REAR SUSPENSION         |         |         |         |
| 64  | Wheel center            | 0.00    | 787.40  | 0.00    |
| 66  | Wheel CV joint          | −0.10   | 676.45  | 0.00    |
| 38a | Upper arm, front bush   | 108.94  | 444.50  | 140.89  |
| 38b | Upper arm, rear bush    | −109.09 | 444.50  | 140.89  |
| 36  | Upper arm ball joint    | −0.08   | 700.38  | 140.89  |
| 32a | Lower arm, front bush   | −0.08   | 238.13  | −95.33  |
| 32b | Lower arm, rear bush    | −322.78 | 238.13  | −94.06  |
| 30  | Lower arm ball joint    | −0.08   | 706.42  | −95.25  |
| 62  | Upper actuator joint    | −43.51  | 513.84  | 696.39  |
| 60  | Lower actuator joint    | −0.18   | 612.75  | 76.17   |
|     | Inner toe link bush     | −132.56 | 298.45  | −62.00  |
|     | Outer toe link ball joint| −127.08| 717.02  | −63.50  |
|     | Halfshaft/Differential joint| 16.84| 130.86 | 9.02    |

In this application, the rear actuators had an active travel range of 102 millimeters in jounce and 108 millimeters in rebound, for a total active range of over 200 millimeters. The front actuators had an active travel range of 108 millimeters in jounce and 90 millimeters in rebound.

The front of this active Lexus had a static Roll Center Height (RCH) of 119 millimeters (calculated at the active suspension ride height which is approximately at the center of suspension travel). This resulted in a tread width change of about 33 millimeters, which is more than I prefer. The rear of the Lexus had a RCH of zero millimeters and a maximum rear tread change of only 2.5 millimeters.

As another example of an acceptable front suspension configuration, a stock 1995 CHEVROLET BLAZER was equipped with an active suspension with the following front suspension points:

|     |                          | X       | Y      | Z      |
| --- | ------------------------ | ------- | ------ | ------ |
| 78  | Wheel Center             | 0.00    | 780.93 | 0.00   |
| 80  | Upper actuator joint     | −46.06  | 523.86 | 708.70 |
| 82  | Lower actuator joint     | −7.63   | 601.24 | 110.40 |
| 22a | Lower arm, front bush    | 226.07  | 247.00 | −87.00 |
| 22b | Lower arm, rear bush     | −134.43 | 247.00 | −87.00 |
| 20  | Lower arm ball joint     | 4.95    | 712.26 | −76.00 |
| 84  | Inner tie rod pivot      | 138.07  | 217.18 | −20.80 |
| 86  | Outer tie rod ball joint | 155.27  | 734.50 | −4.50  |

In the BLAZER front suspension, the actuators had an active travel range of 108 millimeters in both jounce and rebound, for a total active range of about 216 millimeters.

On the Blazer, the front RCH was set at 11 millimeters, resulting in a 17 millimeter front tread width change.

A number of embodiments of the invention have been described. Nevertheless, it will be understood that various modifications may be made without departing from the spirit and scope of the invention. Accordingly, other embodiments are within the scope of the following claims.

What is claimed is:

1. A wheel suspension for suspending a wheel assembly from a sprung body of a wheeled vehicle, and adapted to permit the wheel assembly to move relative to the sprung body through a jounce and rebound vertical travel limited by mechanical stops, the suspension comprising:

an upper structural member coupled to the wheel assembly to define an upper relative rotation center, and rotationally coupled to the sprung body at an upper pivot;

a lower structural member coupled to the wheel assembly to define a lower relative rotation center disposed on a side of a gravitational center of the wheel assembly opposite the upper relative rotation center, and rotationally coupled to the sprung body at a lower pivot; and an actuator connected to both the wheel assembly and the sprung body and capable of applying an active control force between the body and wheel assembly to move the wheel assembly over an active control range comprising at least 80 percent of the vertical travel of the wheel assembly;

the upper and lower pivots and relative rotation centers being positioned to produce a maximum horizontal kinetic displacement of the wheel assembly of less than about 4.0 millimeters as the actuator moves through the active control range.

2. The wheel suspension of claim 1 wherein the maximum horizontal kinetic displacement is less than about 1.5 millimeters.

3. The wheel suspension of claim 1 wherein the maximum horizontal kinetic displacement is less than about 0.75 millimeters.

4. The wheel suspension of claim 1 wherein the maximum horizontal kinetic displacement is less than about 0.30 millimeters.

5. The wheel suspension of claim 1 wherein horizontal kinetic displacement as measured along an axis running in a direction of travel of the vehicle is less than about 0.5 millimeters.

6. The wheel suspension of claim 1 wherein horizontal kinetic displacement as measured along an axis extending perpendicular to a direction of travel of the vehicle is less than about 3.5 millimeters.

7. The wheel suspension of claim 1 wherein the wheel assembly is a rear wheel assembly of an automobile.

8. The wheel suspension of claim 7 wherein the relative rotational centers are disposed rearward and outboard of their respective pivots.

9. The wheel suspension of claim 7 wherein the wheel assembly has a horizontally unsprung mass weight greater than about 120 pounds (530 Newtons).

10. The wheel suspension of claim 9 wherein the wheel assembly includes a damper mass vertically sprung with respect to a remainder of the wheel assembly.

11. The wheel suspension of claim 1 wherein the active control range covers a vertical displacement of the gravitational center of the wheel assembly of at least 0.2 meters.

12. The wheel suspension of claim 1 wherein the actuator has an active stroke sufficient to displace the gravitational center of the wheel assembly through its entire vertical travel.

13. The wheel suspension of claim 1 defining a geometry selected to produce a maximum wheel toe change of less than about 0.1 degrees through said vertical travel.

14. The wheel suspension of claim 1 defining a geometry selected to produce a maximum wheel camber change of less than about 3.0 degrees through said vertical travel.

15. The wheel suspension of claim 1 wherein the upper relative rotation center and upper pivot are disposed along a first generally horizontal line, and the lower relative rotation center and lower pivot are disposed along a second generally horizontal line, with the automobile at rest and loaded to its design weight.

16. The wheel suspension of claim 15 wherein the upper and lower rotation centers are separated from their respective pivots by different arm lengths.

17. The wheel suspension of claim 1 wherein the mechanical stops are positioned to allow at least about 2.0 inches (50 millimeters) of jounce and about 2.0 inches (50 millimeters) of rebound.

18. The wheel suspension of claim 17 wherein the mechanical stops are positioned to allow at least about 3.0 inches (75 millimeters) each of jounce and rebound.

19. The wheel suspension of claim 18 wherein the mechanical stops are positioned to allow at least about 4.0 inches (100 millimeters) each of jounce and rebound.

20. The wheel suspension of claim 1 wherein the pivots are located inboard of their relative rotational centers.

21. The wheel suspension of claim 1 wherein lateral displacement of a tire patch defined between wheel assembly and a support surface, multiplied by lateral tire stiffness, yields a maximum product of less than about 500 pounds (2200 Newtons).

22. The wheel suspension of claim 21 wherein the maximum product of lateral displacement of the tire patch and lateral tire stiffness is less than about 150 pounds (670 Newtons).

23. The wheel suspension of claim 1 wherein overall angulation of a wheel rim of the wheel assembly about a vertical axis through the vertical travel, multiplied by a cornering stiffness of a tire of the wheel assembly, yields a product of less than about 30 pounds (130 Newtons).

24. The wheel suspension of claim 1 defining a geometry selected to produce a maximum tread width change of less than about 5 millimeters through said vertical travel.

25. A wheel suspension for suspending a wheel assembly from a sprung body of a wheeled vehicle, and adapted to permit the wheel assembly to move relative to the sprung body through a jounce and rebound vertical travel limited by mechanical stops, the suspension including an actuator connected to both the wheel assembly and the sprung body and capable of applying an active control force between the body and wheel assembly to move the wheel assembly through an active control range along its vertical travel; and a structural link coupled to the wheel assembly to define a relative rotation center, and rotationally coupled to the sprung body at a pivot;

the suspension forming a geometry selected to produce a maximum lateral displacement of the gravitational center of the wheel assembly of less than about 20 millimeters through the jounce and rebound vertical travel, and a maximum wheel camber change of less than about 3.0 degrees through said jounce and rebound vertical travel.

26. The wheel suspension of claim 25 wherein the structural link is a first structural link coupled to the wheel assembly to define a first relative rotation center, and rotationally coupled to the sprung body at a first pivot, the suspension further comprising a second structural link coupled to the wheel assembly to define a second relative rotation center above the first relative rotation center, and rotationally coupled to the sprung body at a second pivot above the first pivot.

27. The wheel suspension of claim 25 for suspending a rear wheel assembly from a sprung body of a wheeled vehicle and defining a geometry selected to produce a maximum longitudinal displacement of less than about 4.0 millimeters.

28. The wheel suspension of claim 25 for suspending a front wheel assembly from a sprung body of a wheeled vehicle and defining a geometry selected to produce a maximum longitudinal displacement of less than about 5.0 millimeters.

29. The wheel suspension of claim 25 defining a geometry selected to produce a maximum horizontal kinetic displacement of the wheel assembly of less than about 4.0 millimeters as the actuator moves through its active control range.

30. The wheel suspension of claim 29 wherein the active control range covers a vertical displacement of the gravitational center of the wheel assembly of at least 0.2 meters.

31. The wheel suspension of claim 25 defining a geometry selected to produce a maximum wheel toe change of less than about 0.1 degrees through said vertical travel.

32. The wheel suspension of claim 25 wherein lateral displacement of a tire patch defined between wheel assembly and a support surface, multiplied by lateral tire stiffness, yields a maximum product of less than about 500 pounds (2200 Newtons).

33. The wheel suspension of claim 25 wherein overall angulation of a wheel rim of the wheel assembly about a vertical axis through the vertical travel, multiplied by a cornering stiffness of a tire of the wheel assembly, yields a product of less than about 30 pounds (130 Newtons).

34. The wheel suspension of claim 25 defining a geometry selected to produce a maximum tread width change of less than about 20 millimeters through said vertical travel.

35. A wheel suspension for suspending a wheel assembly from a sprung body of a wheeled vehicle, and adapted to permit the wheel assembly to move vertically relative to the sprung body, the suspension including an actuator connected to both the wheel assembly and the sprung body and capable of applying an active control force between the body and wheel assembly to move the wheel assembly vertically over a total active control range of vertical wheel displacement, the suspension forming a geometry selected to produce a maximum horizontal kinetic displacement of the wheel assembly of less than about 3.0 millimeters as the wheel assembly is moved through said total active control range of vertical wheel displacement.

36. The wheel suspension of claim 35 wherein the maximum horizontal kinetic displacement is less than about 1.5 millimeters.

37. The wheel suspension of claim 35 wherein horizontal kinetic displacement as measured along an axis running in a direction of travel of the vehicle is less than about 0.5 millimeters.

38. The wheel suspension of claim 35 wherein horizontal kinetic displacement as measured along an axis extending perpendicular to a direction of travel of the vehicle is less than about 3.5 millimeters.

39. The wheel suspension of claim 35 wherein the wheel assembly is a rear wheel assembly of an automobile.

40. The wheel suspension of claim 39 wherein the relative rotational centers are disposed rearward and outboard of their respective pivots.

41. The wheel suspension of claim 35 wherein the active control range covers a vertical displacement of the gravitational center of the wheel assembly of at least 0.2 meters.

42. The wheel suspension of claim 35 defining a geometry selected to produce a wheel toe change of less than about 0.1 degrees through said vertical travel.

43. The wheel suspension of claim 35 defining a geometry selected to produce a wheel camber change of less than about 3.0 degrees through said vertical travel.

44. The wheel suspension of claim 35 wherein the mechanical stops are positioned to allow at least 2.0 inches (50 millimeters) of jounce and 2.0 inches (50 millimeters) of rebound.

45. The wheel suspension of claim 35 wherein lateral displacement of a tire patch defined between wheel assembly and a support surface, multiplied by lateral tire stiffness, yields a maximum product of less than about 500 pounds (2200 Newtons).

46. The wheel suspension of claim 35 wherein overall angulation of a wheel rim of the wheel assembly about a vertical axis through the vertical travel, multiplied by a cornering stiffness of a tire of the wheel assembly, yields a product of less than about 30 pounds (130 Newtons).

47. A rear wheel suspension for suspending a rear wheel assembly from a sprung body of an automobile, and adapted to permit the rear wheel assembly to move relative to the sprung body through a jounce and rebound vertical travel of at least two inches total, as limited by mechanical stops, the suspension comprising:
   an upper structural member coupled to the wheel assembly to define an upper relative rotation center, and rotationally coupled to the sprung body at an upper pivot; and
   a lower structural member coupled to the wheel assembly to define a lower relative rotation center disposed on a side of a gravitational center of the wheel assembly opposite the upper relative rotation center, and rotationally coupled to the sprung body at a lower pivot;
   the suspension defining a geometry selected to produce a maximum lateral displacement of the gravitational center of the wheel assembly of less than about 10 millimeters through said vertical travel, and a maximum wheel camber change of less than about 3.0 degrees through said vertical travel.

48. The wheel suspension of claim 47 further comprising an actuator connected to both the wheel assembly and the sprung body and adapted to apply an active control force between the body and wheel assembly to move the wheel assembly along its vertical travel.

49. The wheel suspension of claim 47 wherein the upper relative rotation center and upper pivot are disposed along a first generally horizontal line, and the lower relative rotation center and lower pivot are disposed along a second generally horizontal line, with the automobile at rest and loaded to its design weight.

50. The wheel suspension of claim 47 wherein the maximum lateral displacement of the gravitational center of the wheel assembly is less than about 5 millimeters.

51. The wheel suspension of claim 47 wherein the maximum wheel camber change is less than about 2.0 degrees through said vertical travel.

52. A wheel suspension for suspending a wheel assembly from a sprung body of a wheeled vehicle, and adapted to permit the wheel assembly to move relative to the sprung body through a jounce and rebound vertical travel limited by mechanical stops, the suspension comprising:
   a lower structural member coupled to the wheel assembly to define a lower relative rotation center disposed on a side of a gravitational center of the wheel assembly opposite the upper relative rotation center, and rotationally coupled to the sprung body at a lower pivot; and
   an actuator connected to both the wheel assembly and the sprung body to define an upper relative rotation center, and rotationally coupled to the sprung body at an upper pivot, the actuator capable of applying an active control force between the body and wheel assembly to move the wheel assembly over an active control range comprising at least 80 percent of the vertical travel of the wheel assembly;

the upper and lower pivots and relative rotation centers being positioned to produce a maximum horizontal kinetic displacement of the wheel assembly of less than about 4.0 millimeters as the actuator moves through the active control range.

53. The wheel suspension of claim 52 wherein the wheel assembly is a front wheel assembly of an automobile, and wherein the horizontal kinetic displacement as measured along an axis extending perpendicular to a direction of travel of the vehicle is less than about 2.0 millimeters.

54. The wheel suspension of claim 52 defining a geometry selected to produce a maximum tread width change of less than about 10 millimeters through said vertical travel.

55. The wheel suspension of claim 52 wherein the maximum horizontal kinetic displacement is less than about 1.5 millimeters.

56. The wheel suspension of claim 55 wherein the maximum horizontal kinetic displacement is less than about 0.30 millimeters.

57. The wheel suspension of claim 52 wherein the wheel assembly has a horizontally unsprung mass weight greater than about 120 pounds (530 Newtons).

58. The wheel suspension of claim 57 wherein the wheel assembly includes a damper mass vertically sprung with respect to wheel a remainder of the wheel assembly.

59. The wheel suspension of claim 52 wherein the active control range covers a vertical displacement of the gravitational center of the wheel assembly of at least 0.2 meters.

60. The wheel suspension of claim 52 defining a geometry selected to produce a wheel toe change of less than about 0.1 degrees through said vertical travel.

61. The wheel suspension of claim 52 wherein the mechanical stops are positioned to allow at least 2.0 inches (50 millimeters) of jounce and 2.0 inches (50 millimeters) of rebound.

62. The wheel suspension of claim 52 wherein lateral displacement of a tire patch defined between wheel assembly and a support surface, multiplied by lateral tire stiffness, yields a maximum product of less than about 500 pounds (2200 Newtons).

63. The wheel suspension of claim 52 wherein overall angulation of a wheel rim of the wheel assembly about a vertical axis through the vertical travel, multiplied by a cornering stiffness of a tire of the wheel assembly, yields a product of less than about 30 pounds (130 Newtons).

64. The wheel suspension of claim 52 defining a geometry selected to produce a maximum tread width change of less than about 20 millimeters through said vertical travel.

* * * * *